(12) United States Patent
High

(10) Patent No.: US 6,229,564 B1
(45) Date of Patent: May 8, 2001

(54) AUTO-TRACE JEWELRY HOLDER

(76) Inventor: Jeffrey L. High, 2403 State St., Bettendorf, IA (US) 52722

( * ) Notice: Subject to any disclaimer, the term of this patent is extended or adjusted under 35 U.S.C. 154(b) by 0 days.

(21) Appl. No.: 08/893,347

(22) Filed: Jul. 16, 1997

(51) Int. Cl.[7] .................................................. G06K 9/00
(52) U.S. Cl. ............................................................ 348/94
(58) Field of Search .............................. 348/94; 312/128; 356/30, 154; 206/6.1, 45.14; 382/100, 108, 109

(56) References Cited

U.S. PATENT DOCUMENTS

| | | | |
|---|---|---|---|
| 4,371,077 | * 2/1983 | Solitt et al. | 206/45.14 |
| 4,391,520 | * 7/1983 | Ziegel | 356/154 |
| 4,776,118 | * 10/1988 | Mizuno | 40/219 |
| 4,920,760 | * 5/1990 | Muhlack | 62/255 |
| 5,125,035 | * 6/1992 | McCarthy et al. | 382/8 |
| 5,255,199 | * 10/1993 | Barkman et al. | 364/474.17 |
| 5,380,080 | * 1/1995 | Rubin et al. | 312/128 |
| 5,422,711 | * 6/1995 | Can | 356/30 |
| 5,515,157 | * 5/1996 | Can | 356/30 |
| 5,535,878 | * 7/1996 | Reed | 206/6.1 |

* cited by examiner

*Primary Examiner*—Chris Kelley
(74) *Attorney, Agent, or Firm*—Alexander B. Ching

(57) ABSTRACT

A system (10) for capturing an image of a piece of jewelry (17) contains a camera (14) surrounded by a dark reflector (16). The camera (14) attaches to a computer (15) that is operable to analyze an image captured by the camera (14). The camera (14) focusses on a piece of jewelry (17) held by an auto-tracing jewelry holder (12). The auto-trace jewelry holder (12) consists of a base support (22), a support member (24), an upper arm (26), and a moveable stage (28). The piece of jewelry (17) is held between the stage (28) and the upper arms (26). A reflective element (30) covers the top of the stage (28) and the upper arm (26). The reflective element (30) reflects the image of the dark reflector (16) directly back to the camera (14). The piece of jewelry (17) reflects only a small portion of the dark reflector (16) back to the camera (14). The image at the camera (14) is of the piece of jewelry (17) on a dark background. The computer (15) can then easily process this image.

10 Claims, 4 Drawing Sheets

AUTO-TRACE JEWELRY HOLDER

TECHNICAL FIELD OF THE INVENTION

The present invention relates to the field of jewelry making and more particularly to an auto-trace jewelry holder.

BACKGROUND OF THE INVENTION

Technology has entered many fields including the field of jewelry. It is now possible to use techniques learned in computer aided drafting and design and apply them to the design of jewelry. One such system that does this is GEMVISION, sold by GemVision Corporation of Bettendorf, Iowa. GEMVISION is a computer-aided design system for the designing of jewelry. In operation, a video camera takes an image of a loose stone or a ring or other piece of jewelry and the image is converted into a digital image. An operator can then manipulate the digital image using a computer and the appropriate software. For example, an operator can have the computer overlay an image of a loose stone over various ring settings so that a customer can preview how the stone will look in a setting before actual production. Similarly, the system can acquire an image of a ring and an operator could design a new setting for the stone in the ring or an enhancement to that ring.

In order for the system to work properly, it must acquire a sharp, well-defined image of the ring, stone, or other item. In the present system, it is sometimes difficult to get a quality image of a shinny object, such as a ring, because the ring tends to reflect the background of the holder holding it in position. This makes it difficult for the computer program to distinguish background from the piece of jewelry.

SUMMARY OF THE INVENTION

From the foregoing, it may be appreciated that a need has arisen for a jewelry holder for a computer aided jewelry design system that enhances the computer's ability to image jewelry. In accordance with the present invention, a jewelry holder for a computer aided jewelry design system is provided which substantially eliminates or reduces disadvantages and problems associated with prior jewelry holders.

In accordance with one embodiment of the present invention a system for capturing an image of a piece of jewelry includes a camera for capturing an image of a piece of jewelry and a computer, coupled to the camera and operable to analyze images from the camera. Also included is a dark reflector located around the camera. A jewelry holder is located at the focus of the camera. The jewelry holder has reflective elements attached to it such that the reflective elements reflect the image of the dark reflector directly back to the camera. This provides a contrasting dark background around the image of the piece of jewelry at the camera.

The present invention provides various technical advantages over conventional jewelry holders. For example, one technical advantages is increasing the contrast between the background and the piece of jewelry, thus allowing the computer to detect the edges of the jewelry. The computer can then automatically, or semi-automatically, trace the image of the jewelry to separate it from the background. Other technical advantages may be readily apparent to one skilled in the art from the following figures, descriptions and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–4 of the drawings, where like numerals are used for like and corresponding parts of the various drawings.

Figure 1:
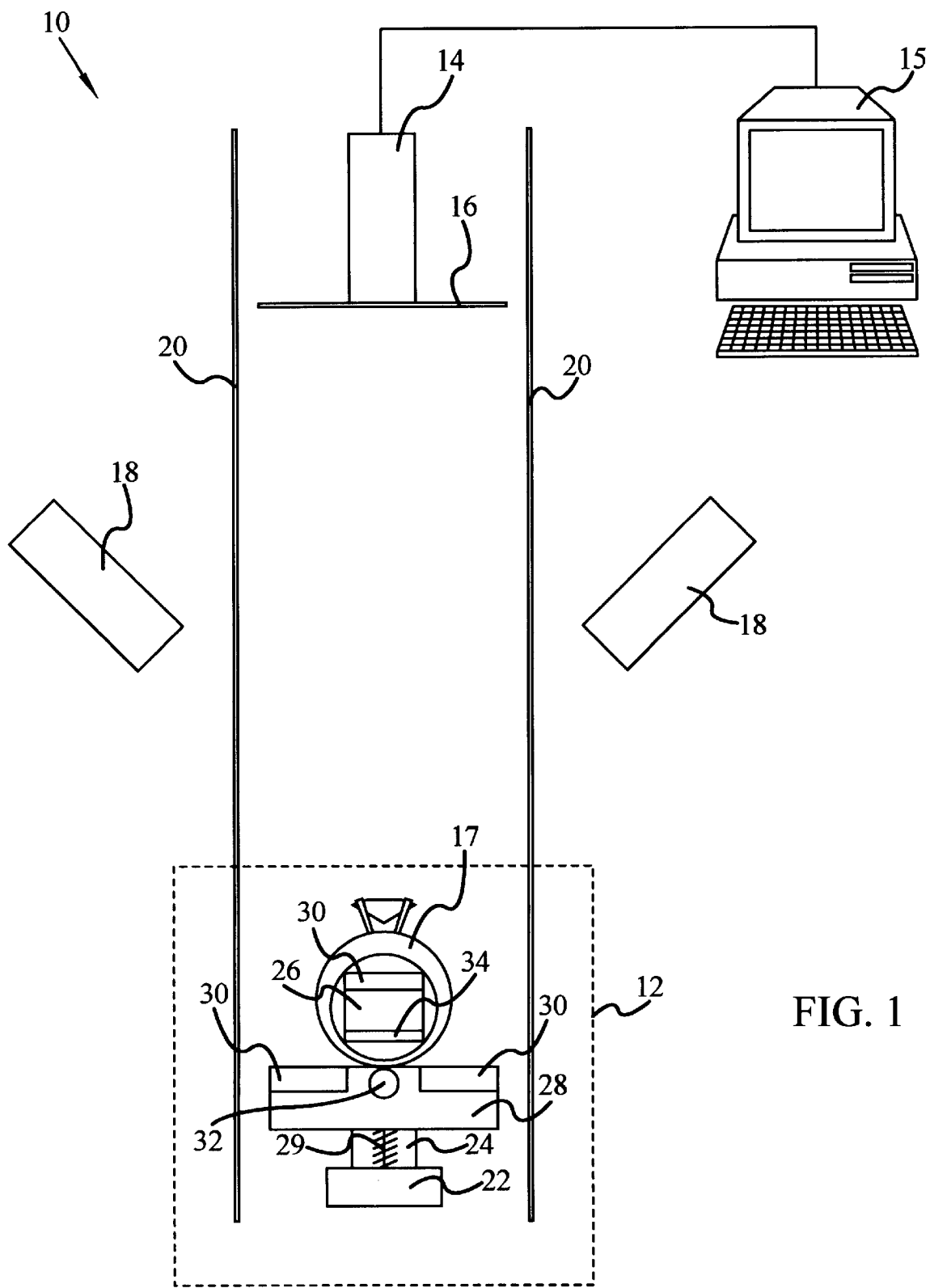
FIG. 1 illustrates the auto-trace jewelry holder in a computer aided jewelry design system.

FIG. 1 illustrates a system 10 for computer aided jewelry design including an auto-trace jewelry holder 12. System 10 consists of a camera 14, which can be a video camera attached to a digitizer, a digital camera, or any other apparatus capable of capturing a digital image for use on a computer. A computer 15 couples to camera 14 and receives the images from camera 14. Software running on computer 15 analyzes those images. In a computer aided jewelry design system, it is important to capture an image where the background can be separated from the item of interest. In that way, the software running on computer 15 can automatically trace around the item of interest. A dark reflector 16 attaches to camera 14. Dark reflector 16 is constructed from a material of dark color and can be installed around or mounted on camera 14, integrated as part of camera 14 or, in some cases, camera 14 can serve as dark reflector 16 as long as a dark material occupies sufficient area around camera 14.

Exterior to camera 14 are illumination sources 18. Illumination sources 18 can be any source of light including room light. The purpose of illumination source 18 is to provide enough light for the proper functioning of camera 14. To this extent, the location, angle, and strength of illumination source 18 is relatively unimportant, as long as camera 14 has sufficient light to operate. Diffusion panels 20 can be provided in order to break direct light into diffuse light.

Auto-trace jewelry holder 12 is located at the focus of camera 14 such that camera 14 can acquire an image of a piece of jewelry 17 in auto-trace jewelry holder 12. Auto-trace jewelry holder 12 can be a clip, a hanger, a support, a base, or any other means for holding jewelry 17 in place at the focus of camera 14. In a particular embodiment, auto-trace jewelry holder 12 comprises a support base 22 and an upper arm 26 connected by a support member 24. A stage 28 connects to support base 22 and can move up and down along support member 24. Stage 28 moves up to secure jewelry 17 between stage 28 and upper arm 26 and moves down to release jewelry 17. This may be accomplished by turning mounting screw 29, or by any other means for moving stage 28 towards and away from upper arm 26. While this embodiment secures jewelry 17 by moving stage 28 towards upper arm 26, jewelry 17 may be secured in many ways including moving upper arm 26 towards stage 28, securing jewelry 17 directly to upper arm 26, among other means for securing jewelry 17 onto auto-trace jewelry holder 12.

On either side of the top of stage 28 and on top of upper arm 26 are a plurality of reflective elements 30. Reflective elements 30 can be mirrors, a reflective coating, or any other reflective material. Reflective elements 30 are parallel to the surface of dark reflector 16 so that reflective elements 30 reflect the image of dark reflector 16 directly back to camera 14. The placement of reflective elements 30, while described in detail in this embodiment, can vary depending on the arrangement of auto-trace jewelry holder 12. The purpose is to have reflective elements 30 surround jewelry 17 such that the image at camera 14 is that of jewelry 17 surrounded by a dark background.

A jewelry adjustment knob 32 is located in the middle of stage 28, between each of reflective elements 30 and engages jewelry 17 when stage 28 is in the up position. Once jewelry adjustment knob 32 contacts jewelry 17, it can be turned to the left or right in order to rotate jewelry 17 to the left or right. In this manner jewelry 17 can be adjusted without touching it or any of reflective elements 30.

In operation, camera 14 focuses on jewelry 17 already in place on auto-trace jewelry holder 12. Reflective elements 30 reflect the image of dark reflector 16 back to camera 14. Jewelry 17, such as a ring, has a shiny surface that also acts to reflect dark reflector 16. However, the surface of jewelry 17 is typically curved and will not reflect all of the image of dark reflector 16 back to camera 14. In fact, the ring will reflect significantly less of dark reflector 16 back to camera 14. Therefore, there is sufficient contrast between the ring and the background such that computer 15 can sufficiently analyze the image of the ring captured by camera 14 and separate the edges of jewelry 17 from the background.

Figure 2:
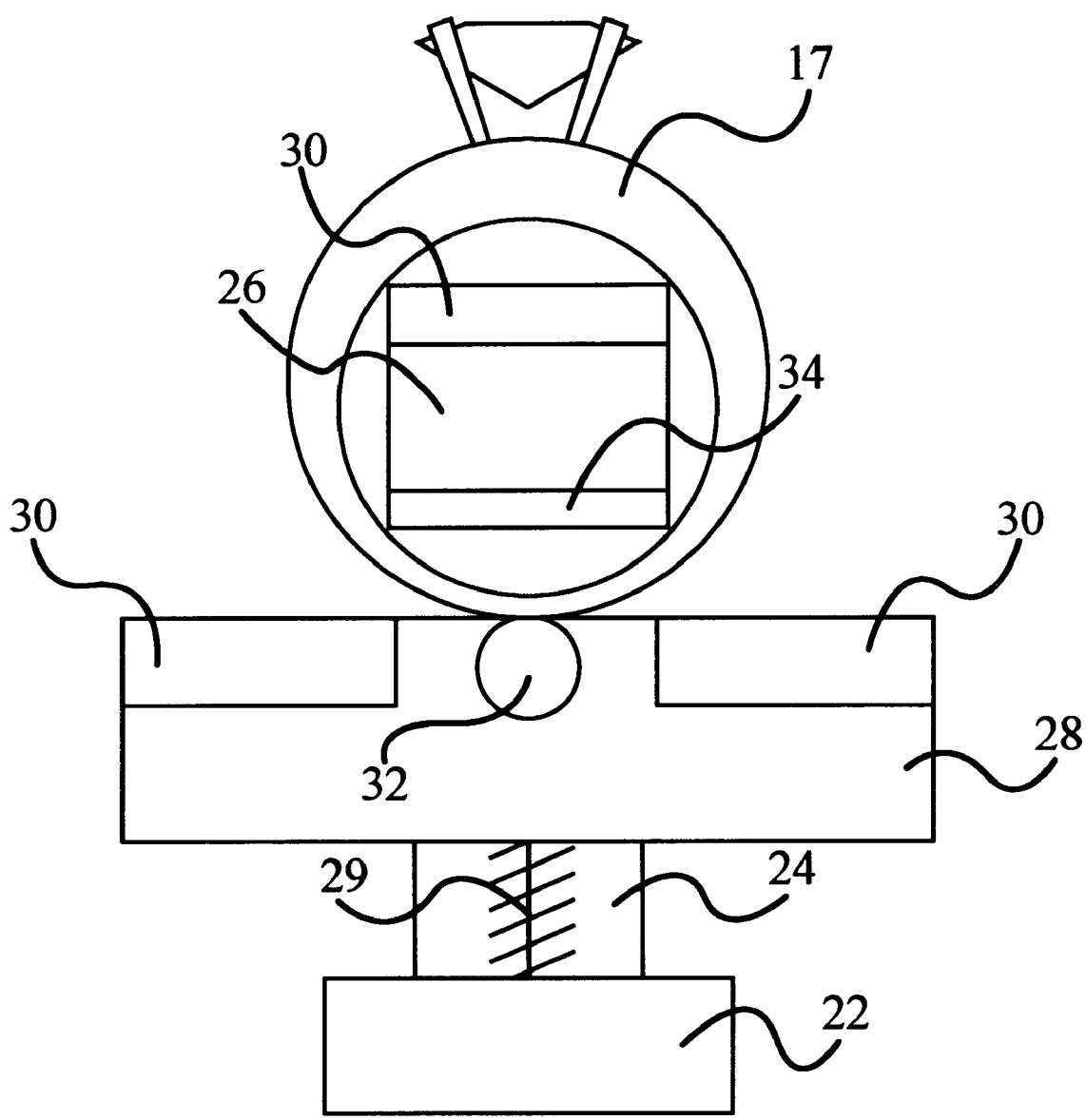
FIG. 2 is a front view of the auto-trace jewelry holder.

FIG. 2 is a front view of auto-trace jewelry holder 12. Illustrated is upper arm 26 and stage 28. Stage 28 is in the up position, holding jewelry 17 in place. A cushion 34 is mounted underneath upper arm 26 to prevent jewelry 17 from being damaged. Each of reflective elements 30 are in place at the sides of stage 28 and the top of upper arm 26. Jewelry adjustment knob 32 is in contact with jewelry 17. Rotating jewelry adjustment knob 32 causes jewelry 17 to rotate to the proper face up position without a user having to touch jewelry 17 or any of reflective elements 30.

Figure 3:
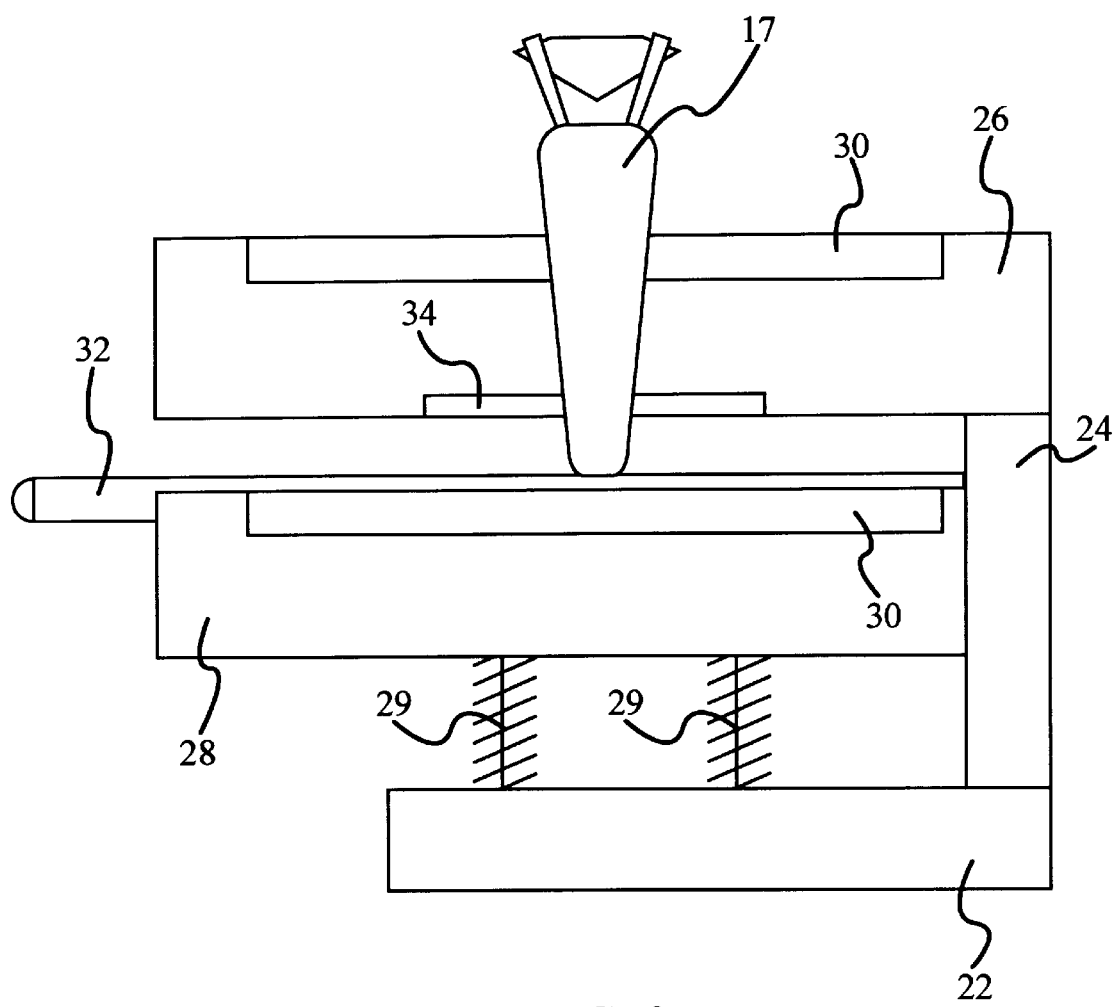
FIG. 3 is a side view of the auto-trace jewelry holder.

FIG. 3 is a side view of auto-trace jewelry holder 12. Illustrated is support base 22, support member 24, upper arm 26, and stage 28. Stage 28 is in the up position and is engaging jewelry 17. Jewelry adjustment knob 32 can be seen making contact with jewelry 17.

Figure 4:
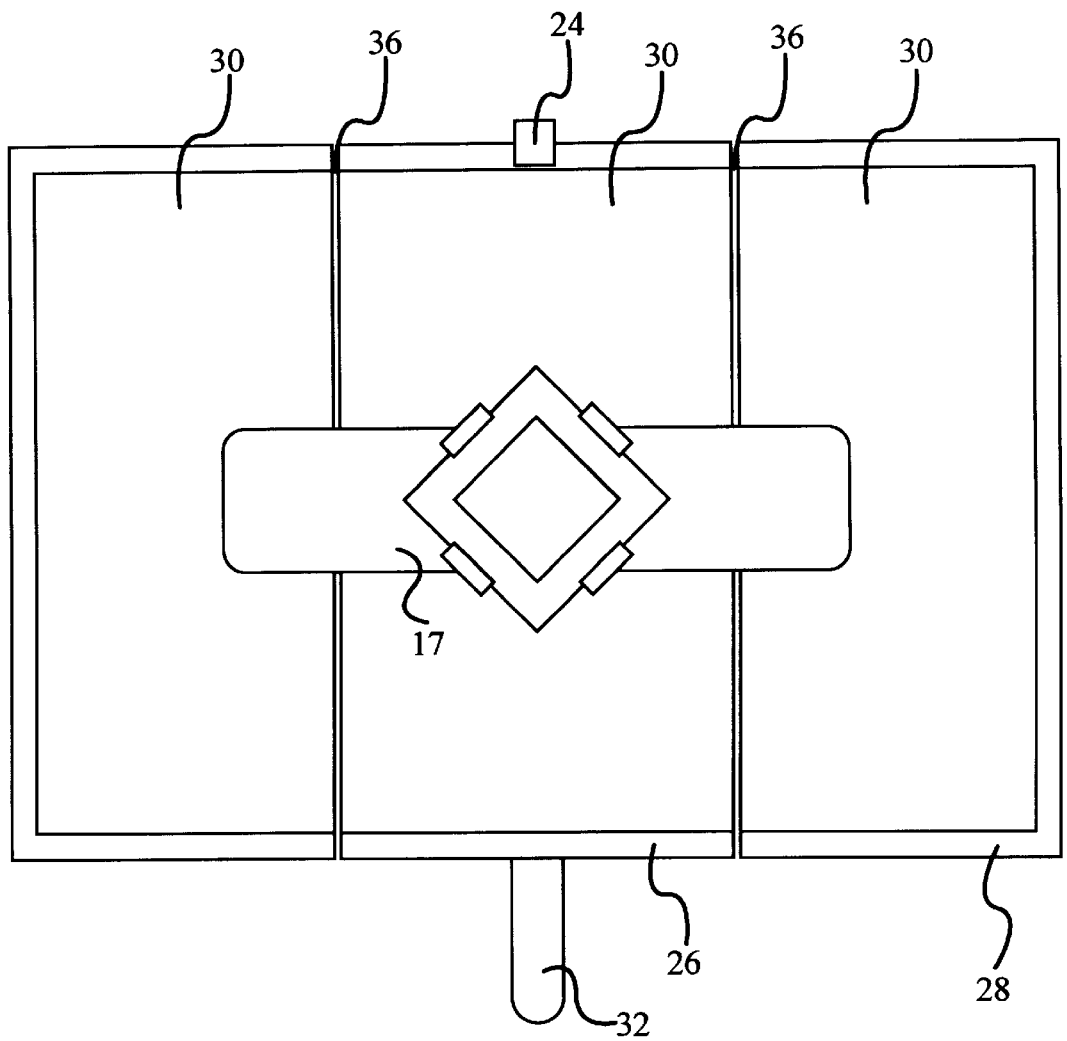
FIG. 4 is a top view of the auto-trace jewelry holder.

FIG. 4 is a top view of auto-trace jewelry holder 12. This is the image that camera 14 would capture. Each of reflective elements 30, since they are placed parallel to dark reflector 16, reflects black or a very dark color directly to camera 14. On the other hand, jewelry 17 has curved surface areas and reflects only a small portion of dark reflector 16 back to camera 14. The result is that the edge of jewelry 17 is clearly defined against the dark background. A series of lines 36 may exist on the image. These lines are where each of reflective elements 30 meet or overlap and can easily be removed by a user of a jewelry design program. Camera 14 can capture this image and computer 15 with appropriate software can remove the background by tracing around the edges of the image, allowing design work on jewelry 17 to commence.

Thus, it is apparent that there has been provided, in accordance with the present invention, an auto-trace jewelry holder that satisfies the advantages set forth above. Although the preferred embodiment has been described in detail, it should be understood that various changes, substitutions, and alterations may be apparent to those skilled in the art and may be made herein without departing from the spirit and scope of the present invention as defined by the appended claims.

What is claimed is:

1. A system for capturing an image of a piece of jewelry, comprising:
    a camera for capturing an image of the piece of jewelry;
    a computer coupled to the video camera and operable to analyze images from the camera;
    a dark reflector located around the camera;
    a jewelry holder located at the focus of the camera for holding the piece of jewelry, the jewelry holder having:
        a reflective element operable to reflect an image of the dark reflector directly back to the camera in order to provide a contrasting background around the image of the piece of jewelry at the camera.

2. The system of claim 1, wherein the jewelry holder further includes:
    a support base;
    an upper arm;
    a support member connecting the support base to the upper arm;
    a stage, coupled to the support base, the stage and the upper arm positioned to form an opening to receive the piece of jewelry, the reflective element attached to either side of the stage and on the upper arm.

3. The system of claim 2, wherein the jewelry holder further has an adjustment knob operable to adjust a position of the piece of jewelry.

4. The system of claim 2, wherein the stage is operable to move up and down along a predetermined path for securing and releasing the piece of jewelry.

5. The system of claim 2, wherein the reflective element has three portions: a first portion attached to one side of the stage, a second portion attached to the other side of the stage and a third portion attached to the top of the upper arm.

6. A holder to hold a piece of jewelry comprising:
    a support for securing the piece of jewelry comprising:
        a support base;
        an upper arm;
        a support member connecting the support base to the upper arm;
        a stage, coupled to the support base, the stage and the upper arm positioned to form an opening to receive the piece of jewelry, the stage operable to move up and down along a predetermined path in order to secure and release the piece of jewelry; and
        an adjustment knob contacting the piece of jewelry for adjusting the piece of jewelry; and
    a reflective element attached to the stage and the upper arm and operable to reflect the image of a dark object back to its source.

7. The holder of claim 6, wherein the reflective element has three portions: a first portion attached to one side of the stage, a second portion attached to the other side of the stage and a third portion attached to the top of the upper arm.

8. A system for capturing an image of a piece of jewelry, comprising:
    a camera operable to capture an image of the piece of jewelry;
    a computer coupled to the video camera and operable to analyze images from the camera;
    a dark reflector located around the camera;
    a jewelry holder located at the focus of the camera and operable to hold the piece of jewelry, the jewelry holder including:
        a support base;
        an upper arm;

a support member connecting the support base to the upper arm;

a stage, coupled to the support base, the stage and the upper arm positioned to form an opening to receive the piece of jewelry;

first and second reflective elements attached to either side of the top of the stage; and a third reflective element attached to the upper arm;

wherein the first, second and third reflective elements reflect an image of the dark reflector directly back to the camera and provide a contrasting background around the image of the piece of jewelry at the camera.

9. The system of claim 8, wherein the jewelry holder includes an adjustment knob operable to adjust a position of the piece of jewelry.

10. The system of claim 8, wherein the stage is operable to move up and down along a predetermined path in order to secure and release the piece of jewelry.

* * * * *